E. O. SULLIVAN.
HARNESS FOR FIRE ENGINES, &c.

No. 171,190.

Patented Dec. 14, 1875.

Witnesses:
John J. Sullivan
Edward G. Osborn

Inventor:
Edward O. Sullivan
By C. W. M. Smith
Attorney

N. PETERS, PHOTO-LITHOGRAPHER, WASHINGTON, D. C.

UNITED STATES PATENT OFFICE.

EDWARD O. SULLIVAN, OF SAN FRANCISCO, CALIFORNIA.

IMPROVEMENT IN HARNESS FOR FIRE-ENGINES, &c.

Specification forming part of Letters Patent No. 171,190, dated December 14, 1875; application filed August 4, 1875.

*To all whom it may concern:*

Be it known that I, EDWARD O. SULLIVAN, of San Francisco, State of California, have invented an Improved Harness for Fire-Engines and other apparatus, of which the following is a specification:

My invention relates to improvements in the construction of harness, and in the manner of arranging it, in connection with a fire-engine or other apparatus; and its object is to enable the horses to be kept unharnessed until at such time when they are needed for work, and then to harness and attach them to the apparatus with expedition and quickness. It consists in dividing or making the harness in parts or sections, in keeping it permanently attached to the pole or fills, and in suspending it from the ceiling by means of straps and spring-catches, in such manner that as the horse takes his position at the engine the harness is dropped upon him from above and quickly secured in place.

Figure 1:
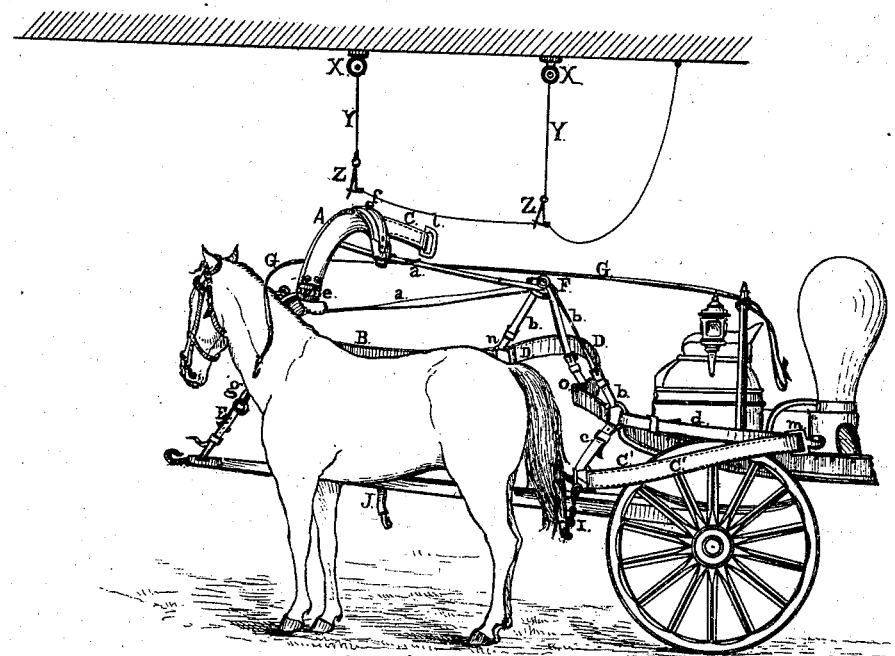
Figure 2:
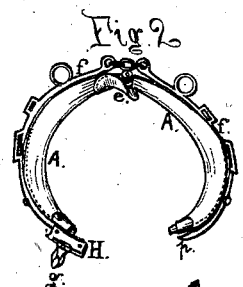
Figure 3:
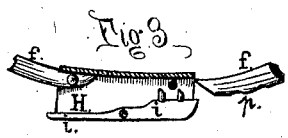
Figure 4:
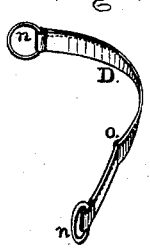
Figure 5:
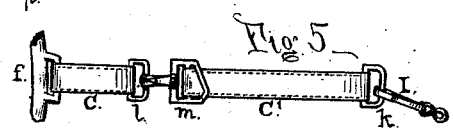
Figure 6:
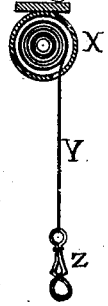

In the accompanying drawing, to which reference is made, Figure 1 shows a perspective view of one set of harness as it is when released from the catches and about to be placed and secured upon the horse. Fig. 2 is a front view of the hinged collar and hames; Fig. 3, a sectional view of the lock securing the ends of the collar and hames; Fig. 4, a perspective view of the hinged breeching; Fig. 5, a view of the divided trace; Fig. 6, a sectional view of the spring-barrel and hoisting-strap.

A represents the collar, formed of two parts, and having the hames permanently fastened to it. B is the inner trace, connected at all times with the collar and hames and the whiffletree. C C' is the outer trace made in two parts, the former secured to the hames, and the latter connected to the whiffletree. D is the breeching, provided with a hinge, so that the outer side may open to admit the horse. E is the pole-strap connecting the collar with the pole. G are the reins, having spring-clips on their ends, by which they are connected with the bits. H is a spring-lock, secured to one side of the hinged collar, and acting to hold the ends of the hames and the collar ends both firmly together around the horse's neck. I is the links connecting the traces with the whiffletrees. X is a small spring-barrel, within which is coiled a strap, Y. The end of this strap is provided with a spring-catch, Z, and when this catch is engaged with the rings of the harness the barrel acts to draw up the harness, and hold it in position above the place occupied by the horse.

The hinged collar A is made in two parts, and its upper ends are connected by the hinge $e$. The hames $f$ are permanently fastened to the collar by means of small rods projecting from the collar and through the hames, and provided with nuts. The under side of the collar is provided with a spring-lock, H, secured to one of the lower points of the hames, and the other point $p$ has a set of holes corresponding with the pins of the spring-bar $i$, so that when the two ends of the collar are brought together the point $p$ will enter the lock and engage with the pins of the bar $i$, and hold the collar together. The form of the collar and hames, and the construction of the lock, are shown in detail in Figs. 2 and 3 of the drawings.

The breeching D is hinged at $o$, so that the outer side will open and allow the horse to enter the harness without interfering with any of the parts. When he takes his position at the side of the pole he is within the harness, and to secure it upon him it is only necessary to close the outer side, and secure the parts to each other by the spring clips or catches provided for the purpose. The long portion C' of the outer trace has a buckle, $m$, with a spring-clip, by which it is connected with the short part C, fastened to the hames on the collar, and when these ends are brought together it forms a complete trace, connecting together the collar and the whiffletree. The straps Y Y are suspended from the spring-barrels X X, secured to the ceiling above the front part of the engine, and their ends are provided with catches Z Z. They act to hold up the harness, and sustain its weight at such height above the pole that the horse when he takes his position at the pole will come into the harness. The springs in the barrels are made of proper strength to hold the harness at any required elevation. These several parts when made and arranged together, as above described, constitute a harness capable of being quickly placed and secured upon the horse as he comes to his position at the engine.

The inner part of the harness or the side next to the pole is all connected together and to the pole and whiffletree, and does not require any handling. The outer side of the harness requires but three motions to secure the horse within it. One motion fastens the collar in place, one connects the parts C C' of the outer trace together, and one fastens the belly-band J to the outer trace by catching the spring-clips on its end into the buckle $l$ on the short trace C, and two additional movements to attach the ends of the reins G to the bit complete the operation of harnessing.

The same arrangement of harness can be readily applied to a hose-cart or other apparatus using one horse; but in such case the divided trace will not be required, and the hinged breeching will not be necessary. The parts will be connected to the shafts, and the entire harness and the shafts will be held up clear at such position that they can be let down upon the horse when he takes his position, and two motions will secure the belly-band and the collar in place and the horse will be harnessed.

The advantages derived from the use of my invention will be evident to those accustomed to the care of horses employed in the fire-service, or at all familiar with the routine of engine-houses. In the present system of the different fire-departments the horses are kept harnessed in their stalls at all times, day and night. They lie down, roll, and sleep in their harness, and it is not allowed to be removed except for the short time given the driver to clean his horses, which, in the city departments, is not more than fifteen minutes to each horse. The harness thus becomes soon defaced and injured, and requires to be washed and cleaned every day, and the irritation and annoyance to the horse in being compelled to wear his harness all day and to sleep in it at night is considerable. My invention benefits the horse, preserves the harness, and enables the driver to devote more time and attention to the care of both.

Having thus fully described my invention, what I claim therein as new, and desire to secure by Letters Patent, is—

1. The arrangement and combination together, in a harness, of the hinged collar A, with its hames $f$, the hinged breeching D, the inner trace B, and the divided outer trace C C', connected to the collar and the whiffletree, and provided with the buckle and spring-clip $l\ m$, as described, and for the purposes specified.

2. The hinged breeching D, with a hinge, $o$, to enable the outer side to open and be thrown back, as described and specified.

3. The combination, with the harness for a fire-engine or like apparatus, of a device for suspending said harness above the place occupied by the horse when attached to the apparatus, substantially as and for the purpose set forth.

EDWARD O. SULLIVAN. [L. S.]

Witnesses:
C. W. M. SMITH,
PHILIP MAHLER.